United States Patent [19]
Godshalk

[11] 3,781,658
[45] Dec. 25, 1973

[54] METHOD AND APPARATUS FOR DETERMINING BATTERY PERFORMANCE AT ONE TEMPERATURE WHEN BATTERY IS AT ANOTHER TEMPERATURE

[75] Inventor: James B. Godshalk, Philadelphia, Pa.

[73] Assignee: Fox Products Company, Philadelphia, Pa.

[22] Filed: Jan. 14, 1972

[21] Appl. No.: 217,760

[52] U.S. Cl. ............................................. 324/29.5
[51] Int. Cl. ......................................... G01n 27/42
[58] Field of Search ..................... 324/29.5; 320/48; 340/249

[56] References Cited
UNITED STATES PATENTS
| | | | |
|---|---|---|---|
| 2,979,650 | 4/1961 | Godshalk et al. | 324/29.5 |
| 3,356,936 | 12/1967 | Smith | 324/29.5 |
| 3,546,576 | 12/1970 | Frezzolini | 324/29.5 |
| 3,593,099 | 7/1971 | Scholl | 324/29.5 |

*Primary Examiner*—Robert J. Corcoran
*Attorney*—D. C. Roylance et al.

[57] ABSTRACT

Both a method and apparatus are disclosed for testing lead-acid storage batteries to determine the cranking amperes which the battery can supply at a predetermined low temperature, typically 0°F., when the battery is in fact at a different temperature. The invention derives from the battery, after a short discharge at substantially its cranking ampere rating, an electrical quantity representative of the actual terminal voltage of the battery at the end of the discharge, and converts this electrical quantity into an observable indication representing the terminal voltage which the battery would exhibit if similarly tested at the predetermined low temperature. The invention is based on the discovery that the terminal voltage of a lead-acid storage battery under load changes predictably with changes in temperature of the battery.

17 Claims, 13 Drawing Figures

3,781,658

METHOD AND APPARATUS FOR DETERMINING BATTERY PERFORMANCE AT ONE TEMPERATURE WHEN BATTERY IS AT ANOTHER TEMPERATURE

BACKGROUND OF THE INVENTION

While numerous methods for testing automotive lead-acid storage batteries have been proposed, the so-called "cranking performance test" based on specifications issued by the Battery Council International (BCI) has been widely adopted in recent years. The cranking performance test is designed to determine whether the battery under test is capable of cranking a particular automotive vehicle engine when at 0° F., and the test is carried out by applying to the fully charged battery an electrical load having characteristics similar to that presented by the starting motor of a vehicle when cranking the engine, and measuring the terminal voltage of the battery under load while the battery is at 0° F. Larger engines require more starting current than small ones, and one practical rule adopted in the field states that the starting current required equals the cubic inch displacement of the engine. The condition of the battery is deemed adequate if the terminal voltage at the end of a 30-second discharge period equals or exceeds 1.2 volts.

While the cranking performance test has distinct advantages, it has heretofore required elaborate and expensive equipment and, even with that equipment, has been practical only for use in battery manufacturing plants, with each test apparatus costing, e.g., 1,000–3,000 dollars. While there is an obvious demand for cold battery testers suitable for use in automotive service stations and the like, the fact that a typical service station battery tester sells for, e.g., 75 dollars, clearly rules out the cranking performance test in such cases.

A primary reason for the high cost and complexity of prior-art cranking performance test apparatus is the fact that it has heretofore been necessary to cool the battery to, e.g., 0° F. before the test could be carried out, and that requirement has, of course, made this test inapplicable to batteries which are in place in a vehicle.

OBJECTS OF THE INVENTION

A general object of the invention is to devise a test method and apparatus which will adequately determine the performance of a lead-acid storage battery at a predetermined low temperature, e.g., 0° F., without requiring that the battery be at that low temperature during the test period.

Another object is to provide a method and apparatus for testing a lead-acid storage battery at ambient temperature and determining, from the test, characteristics which the battery will exhibit at a predetermined low temperature of, e.g., 0° F.

Still another object is to devise a test apparatus capable of accurately determining, while the battery under test is at a normal temperature of, e.g., 80° F., the performance of which the battery is capable at a predetermined low temperature of, e.g., 0° F.

Another object is to provide an inexpensive testing apparatus for approximating the characteristics of a battery at low temperature, by means of test measurements made for the battery under the conditions of ambient temperature, and by applying fixed resistor loads to the battery under test.

A still further object is to provide battery test apparatus capable of testing batteries at any ambient temperature and automatically providing from that test an indication of the battery voltage at rated cranking ampere load for the same battery at, e.g., 0° F. or −20° F. or both 0° F. and −20° F.

SUMMARY OF INVENTION

Generally stated, the invention is based on the discovery that differences in performance of a lead-acid storage battery over a practical temperature range, i.e., from −20° F. to 120° F., depend fundamentally on changes in internal resistance of the battery which are caused by the changes in battery temperature, and that these changes can be predicted in a manner which makes it practical to determine the performance of a battery at a predetermined low temperature, e.g., 0° F., when the battery is in fact at any temperature, within a practical range, different from the predetermined low temperature. The invention thus makes it possible to carry out a cold battery test when the battery being tested is actually at ambient temperature.

Application of the invention to carrying out a cranking performance test under automotive service station conditions, where the battery is in a vehicle just driven into the station, illustrates the invention. Under those circumstances, the aim of the test is to determine whether, if the battery were at 0° F. rather than ambient temperature, it would deliver its rated cranking amperes. In carrying out the test according to the invention, the battery is discharged for a short time at a rate which is at least approximately equal to the cranking ampere rating required by the engine; the actual temperature of the battery is determined; an electrical quantity is derived from the battery which represents the true terminal voltage of the battery at the end of the short discharge period; this electrical quantity is then converted into an observable indication, with the indication being made to differ from that which would accurately represent the actual terminal voltage by an amount dependent upon the difference between the actual terminal voltage of the battery at its temperature at the time of the test and the actual terminal voltage which the same battery would exhibit under the same discharge conditions at 0° F; and then comparing the indication so obtained with that which the same battery whould provide when at 0° F. and good in the sense that it is capable of providing the necessary cranking amperes. Such changing of the observable indication can advantageously be accomplished by so calibrating the equipment employed that the indication provided corresponds to 1.2 volts per cell with the battery at 0° F. and capable of delivering the rated cranking amperes and that the indication provided for the same battery, again capable of delivering its rated cranking amperes, at any temperature other than 0° F. in the range from −20° F. to 120° F. will also correspond to 1.2 volts.

In order that the manner in which the foregoing and other objects are attained in accordance with the invention can be understood in detail, particularly advantageous embodiments thereof will be described with reference to the accompanying drawings, which form a part of this specification, and wherein.

DESCRIPTION OF THE METHOD

The discharge characteristics of any lead-acid type storage battery can be shown as a linear plot of current against voltage with a zero current intercept at about 2.02 volts per cell. The slope of the line depends on the size or capacity of the battery and the charge in the battery. A smaller battery shows a greater slope or drop in voltage with current than a larger one. Similarly, a partially charged battery exhibits a greater voltage drop with current than does a charged one.

The drop in battery voltage with discharge current can be considered due to the internal resistance of the battery. This resistance depends on the size of the battery, the charge in it, and the temperature. Obviously, all of these factors which affect the resistance must be considered in regard to their effects on the battery discharge characteristics.

Figure 1:
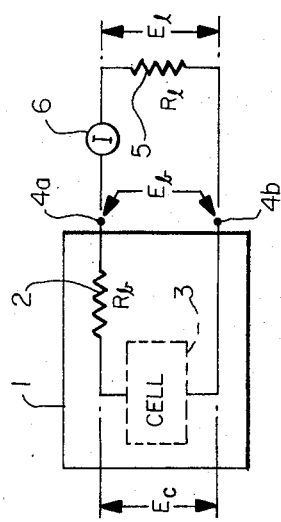
FIG. 1 is an equivalent circuit diagram for a lead-acid storage battery cell under discharge conditions.

The equivalent circuit of a battery cell loaded with a discharge resistor is shown in FIG. 1. In this circuit, the battery 1 presents both an internal resistance 2 schematically indicated as $R_b$ and a cell voltage generator 3. The voltage developed at this cell is labelled $E_c$ and the voltage between the terminals 4a and 4b is indicated as $E_b$. The load resistor 5 is labelled $R_1$ and the voltage across the load resistor $E_1$. An ammeter 6 is shown connected in series between the battery and the load resistor. Further details on this equivalent circuit and the theory of operation are provided in *Storage Batteries*, G. W. Vinal, 4th Edition, John Wiley & Sons, Inc., New York, N.Y., in Chapters 4 and 7.

Figure 2:
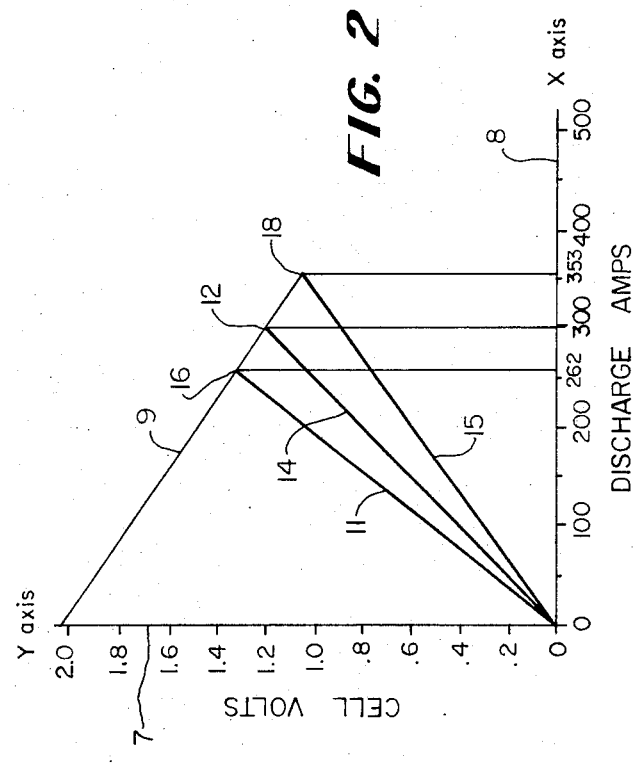
FIG. 2 is a graph illustrating the discharge characteristics of a typical lead-acid storage battery in terms of discharge current versus cell voltage and voltage current characteristics of typical load resistors.

It is convenient to plot the values based on the circuit of FIG. 1 graphically, this type of graph being commonly called a load line. FIG. 2 presents such a graph showing the discharge characteristics of one cell at 0° F. of a typical three or six cell automotive type lead-acid storage battery, the y-axis 7 of the graph being graduated in terms of voltage from 0 to 2.0 volts and the x-axis 8 being graduated in terms of amperage from 0 to 500 amperes. Line 9 represents the average discharge characteristics at 0° F. of a cell with a cranking ampere rating of 300. This rating is defined as the discharge current that the cell, or battery, at 0° F. can supply for 30 seconds at a cell voltage of at least 1.20. The load line 14 represents the volt/ampere characteristics of a fixed resistor $R_1$ of 0.004 ohms. When this resistor is connected across the cell shown, the intersection of the load lines at 12 defines the resultant current and voltage. Thus, point 12 indicates that the cell voltage will be 1.20 and the current 300. If this reading is taken on a fully charged cell after 30 seconds of discharge through $R_1$, the cranking ampere rating of the cell is confirmed. For many practical purposes, the 30 second wait time is not important, and a reading after 10–15 seconds is essentially accurate. The wait time should not be too long, however, since continuous application of the load will drain the battery excessively.

Other fixed resistance load lines are also shown in FIG. 2. Thus, lines 11 and 15 are for fixed resistors of 0.003 and 0.005 ohms, respectively. Note that when these resistors are connected to the cell, the load lines intercept at points 16 (1.3 volts, 262 amps) and 18 (1.06 volts and 353 amps), respectively. Thus, FIG. 2 illustrates that only one specific resistor connected to the cell will result in rated cranking current and voltage.

Figure 4:
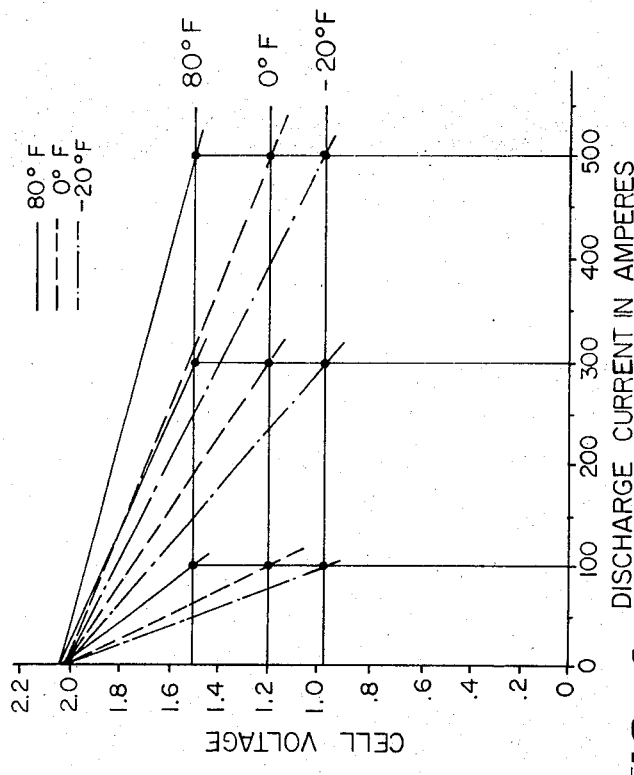
FIG. 4 is a graph showing load lines for three different battery cells each at three different temperatures.

In FIG. 4, volt/ampere load lines are shown for three cells of different energy content, at three different temperatures. By definition of cranking amperes, all cells have the same voltage of 1.20 at 0° F. I have discovered that, when the cells are substantially fully charged and are discharged at the rated cranking amperes, all cells also have essentially the same voltage at all other temperatures within a practical range of, e.g., from −20° F. to 120° F. Thus, at 80° F., all cells, regardless of size, will exhibit a voltage of 1.49, if the cell was fully charged and was discharged at its rated cranking amperes. And, at −20° F., all cells will have a voltage of about 0.97. This uniformity is surprising, since it is rare, save for the exception of open circuit voltage, for any characteristic of lead-acid storage batteries to be the same for different sizes of batteries over a range of temperatures.

Further, I have discovered that, insofar as its ability to supply current at any practical voltage is concerned, a battery which is only partially charged will perform as if it were a battery of correspondingly lower cranking ampere rating. Thus, for example, a battery which has a cranking ampere rating of 400 but is only 50 percent charged will perform as a fully charged battery having a cranking ampere rating of 200. Thus, both a fully charged battery rated at 200 amperes and a half charged battery rated at 400 amperes will provide 1.2 volts per cell at 0° F. and 1.49 volts per cell at 80° F. when discharged at the 200 ampere rate. Accordingly, the method is not always limited to discharging the battery at its full rated cranking amperes, but rather is operative to determine whether or not a battery presented for testing is capable of delivering a stated cranking ampere at, e.g., 0° F. As an example of a particular case in which the method can be practiced to advantage with discharge of the battery at less than its full cranking ampere rating, and without concern as to the state of charge of the battery, consider the case of an automobile having an engine with a cubic inch displacement of 200 but equipped with a battery rated at 400 cranking amperes. Using one "standard" accepted in the trade, the battery should pass the cranking ampere test if, at 0° F., it can supply 200 amperes at a cell voltage of 1.2. Thus, taking 0° F. as the predetermined temperature, 200 amperes can be stated as the cranking amperes required of the battery, and in testing the battery according to the invention, the battery is discharged substantially at 200 amperes, rather than at the full rating of 400 amperes. If the indication provided by the test then corresponds to at least 1.2 volts per cell, the battery is accepted as passing the test. On the other hand, new batteries not yet placed in use are tested in fully charged condition, with the short discharged carried out at the full cranking ampere rating assigned to the battery by the manufacturer.

In view of these discoveries, it is possible to determine the value of the cell voltage of a lead-acid storage battery at one temperature and convert that value into a new value which is that which the battery would exhibit at another temperature. Thus, since all batteries which are capable of delivering the full cranking amperes stated as being required and which have been discharged briefly substantially at the stated cranking amperes will show a cell voltage of 1.49 at 80° F., and similarly a cell voltage of 1.2 at 0° F., the 1.2 volt value which would be exhibited by the battery if tested at 0° F. can be derived from the 80° F. test simply by decreasing the value of 1.49 by 0.29.

When the battery under test is not capable of supplying the stated cranking amperes, conversion of the 80° F. voltage value to the 0° F. value by subtracting 0.29 will not yield a precisely correct value. Thus, in the case of a battery for which the stated cranking current is 300 amperes, but which is deficient to the extent that it supplies only 280 amperes under the test conditions, the voltage obtained at 80° F. will be 1.42, and subtraction of 0.29 from that value yields a value of 1.13 volts, while the battery will in fact provide only 1.10 volts if actually at 0° F. But this error is so small as to be ignored, for practical purposes, and vanishes when the battery is at rating. As will be apparent from FIG. 4, the error occurs because, when the battery is not capable of supplying the full stated cranking amperes, it performs as a battery having a lower rating and the voltage temperature coefficient is therefore correspondingly less than that which provides the voltage difference of 0.29 between 0° F. and 80° F. when the battery performs with its full cranking ampere rating.

While the method has been explained with reference to 0° F. as the predetermined temperature, other predetermined temperatures can be used. Thus, when the predetermined temperature is specified as −20° F., and testing is actually carried out with the battery at 80° F., conversion of the actual voltage to that which would be obtained if the battery were at −20° F. can be accomplished by subtracting 0.52 volts per cell from the 80° F. reading. In the foregoing explanation, the phenomena on which the method is based have been purposely simplified by choosing only two temperatures, one of which is the specified low temperature. The temperature effects over the range from −20° F. to 120° F. are known, through this invention, and can be accommodated by the method.

While it is practical to assign linearity, or approximate linearity, to the voltage temperature coefficient, as later explained, this is not the case, as will be apparent from FIG. 3. Here, curve R defines an average of actual voltage values determined by discharging a fully charged battery at its rated cranking amperes for 30 seconds, with the battery actually at the temperature indicated, and measuring the terminal voltage of the battery at the end of the 30 second period, while the battery is still being thus discharged. As will be seen, curve R is essentially parabolic. Since the precise shape and position of the curve is affected by specific construction details of the battery, curve R is accepted as an average or ideal curve and, following the practice in the battery testing field of allowing a maximum error of ±10 percent, particularly in the case of automotive service station testing, similar curves $R_t$ and $R_b$ are provided to define an overall broad area A within which any curve representing the temperature effect on cell voltage which is useful according to the invention will fall.

Over the range from 0° F. to 120° F., curve R is approximated by the equation $$E = 1.2 + (T)^{.5}/31$$

wherein $E =$ cell voltage of the battery under rated load and $T =$ the actual temperature of the battery, at the time of testing, in degrees Fahrenheit. This equation yields the curve indicated at S in FIG. 3, which curve can be accepted as a standard over that temperature range. Similarly, over the entire range from −20° F. to 120° F., curve R is approximated by the equation $$E = 0.97 + (T')^{.5}/19.2$$

wherein E again represents battery cell voltage under rated load and T' is the actual battery temperature, in degrees Fahrenheit, + 20°. Equation (2) yields curve U, FIG. 3.

Figure 3:
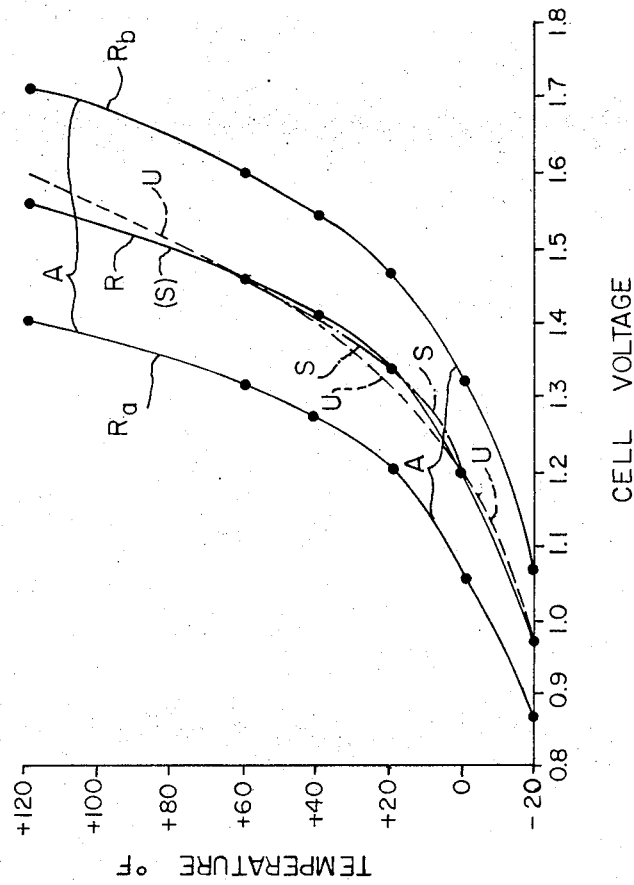
FIG. 3 is a graph illustrating the cell voltage with changing battery temperature for lead-acid storage batteries.

Since all lead-acid storage batteries, regardless of size, exhibit the same voltage at any particular temperature in the practical range of from −20° F. to 120° F when the voltage is determined while the battery is being discharged at a stated cranking ampere rate, and since the manner in which the voltage changes with changes in temperature is now known from FIG. 3, it is feasible to determine the performance of a lead-acid storage battery at any predetermined temperature by testing the battery when it is at a different temperature. Stated broadly, this is accomplished according to method embodiments of the invention by discharging the battery substantially at a predetermined rate, advantageously at the rated cranking amperes of the battery or needed by the car for a short period of time; determining the actual temperature of the battery at the time of testing; deriving from the battery while it is being so discharged an electrical quantity representative of the actual terminal voltage of the battery at the end of the short discharge time period; converting that electrical quantity into an observable indication which differs from that which would accurately indicate the actual terminal voltage by an amount corresponding to the value obtained by determining, from a curve which falls within area A, FIG. 3, and which represents cell voltage versus temperature substantially at rated discharge current, the difference between the voltage values of said curve at the actual temperature of the battery and at the predetermined temperature; and comparing said indication with that which should be exhibited by the battery, if capable of supplying the stated current, at said predetermined temperature.

When accuracies at least within ±5 percent are required, as when the method is practiced by a battery manufacturer to assure that new batteries actually come up to their cranking ampere rating, the step of discharging the battery is carried out by maintaining the discharge current essentially constant at the cranking ampere rating; the electrical quantity obtained is the actual terminal voltage; the step of converting that voltage into a meaningful indication includes algebraically adding to the actual voltage a value determined from curve R, FIG. 3, and then indicating the resulting value as the voltage which the battery under test would actually exhibit at the predetermined temperature; and the step of comparing is accomplished simply by determining if the indication comes up to the value specified for the predetermined temperature. If the predetermined temperature is 0° F., the method is conveniently carried out with the battery at ambient temperatures and thus greater than 0° F., the value to be algebraically added is best derived from curve S, FIG. 3, and thus in accordance with equation (1), and the target value for comparison is then 1.2 volts per cell for automobile batteries.

For automotive service station purposes, the predetermined temperature can be taken as 0° F., the electrical quantity derived from the battery can be the actual terminal voltage, and in converting the terminal voltage into an observable indication, the actual terminal voltage is reduced by an amount $T^p/M$ volts per cell, where T is the actual terminal voltage, $p = 0.5$, and M is a value selected in the range 26–36 to provide a test accuracy, within ±10 percent, for batteries under test at 80° F. With the method thus carried out, the resulting indication is compared with one correspondingly indicating 1.2 volts per cell for automobile batteries.

Figure 3A:
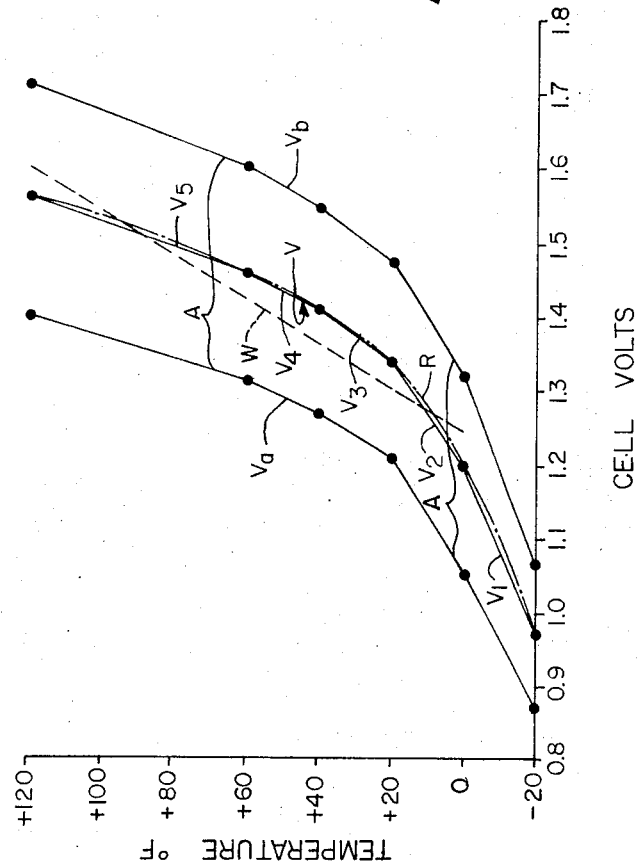
FIG. 3A is a graph, similar to that of FIG. 3, but with curves approximated by one or a series of straight line segments.

In the embodiments of the method described with reference to FIG. 3, modification of the indication into which the derived electrical quantity is converted is accomplished by using a curve, such as curve R or curve S, which falls within the area A, FIG. 3. Accurate matching of such a curve requires, e.g., careful and exact temperature compensation of the test equipment. In some cases, it is advantageous to employ curves which are made up of straight line segments, as in FIG. 3A, in such fashion as to approximate the actual voltage/temperature curve, since it is sometimes easier and less expensive to provide linear temperature coefficients in the test apparatus. Referring to FIG. 3A, a curve V, closely approximating curve R, is made up of a plurality of straight line segments $V_1 - V_5$, each approximating a different segment of curve R. Thus, segment $V_1$ commences at the voltage value 0.97 at −20° F. and extends to the intercept of curve R with the 0° F. line; segment $V_2$ commences at that intercept and extends to the intercept of curve R with the 20° F. line; segment $V_3$ extends from that intercept to the intercept of curve R with the 40° F. line; segment $V_4$ extends from that intercept to the intercept of curve R with the 60° F. line; and segment $V_5$ extends from that intercept to the intercept of curve R with the 120° F. line. The straight line segments $V_1-V_5$ have slopes of 0.0115, 0.007, 0.0035, 0.0025, and 0.0015, respectively. These straight line segments can be expressed by equations, as follows:

| Segment | Equation |
|---|---|
| $V_1$ | $E = 0.97 + 0.0115T + 20$ |
| $V_2$ | $E = 1.20 + 0.007T$ |
| $V_3$ | $E = 1.34 + 0.0035T - 20$ |
| $V_4$ | $E = 1.41 + 0.0025T - 40$ |
| $V_5$ | $E = 1.46 + 0.0015T - 60$ | where E is the cell voltage and T is the actual battery temperature in degrees Fahrenheit. Since each segment of curve V is a straight line, the temperature coefficients required to match that line are linear and easily provided, for example, by a portion of a tapped temperature compensating resistor, as later described with reference to FIG. 9.

Coarser approximations of curve R, or of curve S, are acceptable according to the invention, so long as the resulting curve lies wholly within the area A, which is defined by limit curves $V_1$ and $V_b$ which correspond to curves $R_a$ and $R_b$, FIG. 3, respectively, and provide for the allowed ±10 percent accuracy. Thus, for example, curve R can be roughly approximated by the straight line W, FIG. 3A, over the range from 0° F. to 120° F. Line W represents the general equation $$E = A + KT,$$

wherein
E = battery cell voltage
A = a stated cell voltage value for the battery at 0° F.
K = the voltage temperature coefficient, and
T = the actual battery temperature in °F.

For greatest accuracy, the value of 1.25 volts is assigned to A and K is taken as 0.0029 volts per cell the slope of the line W, these values making line W extend as an optimum approximation of the corresponding portion of curve R and wherein the accuracy of ±10 percent yields values for K, or the slope of the line W, of 0.0026 and 0.0032. For automotive service station purposes, however, the value for A can be selected from the range 1.08–1.32 and that for K can be selected from the range 0.002–0.004 volts per cell per °F.

When the term "short period of time" is employed herein, that term can be defined as a period selected from the range 5–100 seconds, the specific value chosen depending upon the type of battery, e.g., whether an automobile battery, a truck battery, etc., and whether the test is carried out under conditions such that the battery is likely to have a significant surface charge. Considering automobile batteries in use, the short period of time is advantageously in the range of 10–40 seconds, it being assumed that such a battery will have a significant surface charge, and the maximum value of 40 seconds is short enough to keep the battery from being drained excessively by the test. When automobile batteries have not yet been placed in service, presence of a significant surface charge is less likely, and shorter discharge periods can be used.

GENERIC APPARATUS EMBODIMENT

Figure 5:
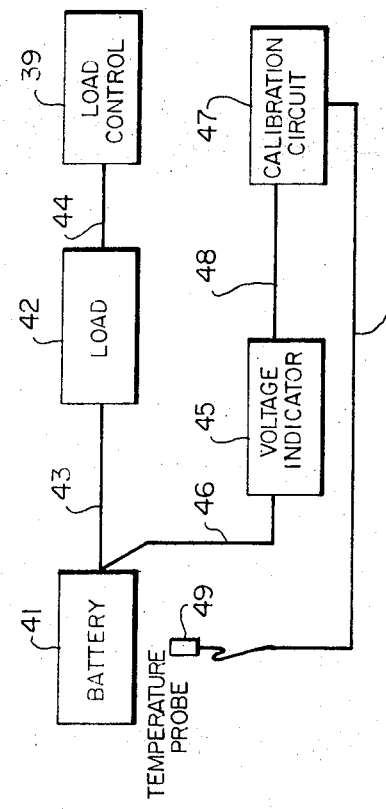
FIG. 5 is a generalized block diagram of cold battery test apparatus according to the invention.

A cold battery test apparatus which capitalizes on the relationships shown in FIG. 3 to carry out the method is shown in the simplified block diagram of FIG. 5. Here a battery 41 is shown connected to a load circuit 42 through multiconductor path 43. Load selection and load control is maintained by use of the load control circuit 39 which is connected to the load 42 by the multi-conductor path 44. The voltage indicator 45 is connected across the terminals of the battery 41 by means of multi-conductor path 46. Meter calibration is accomplished by means of the meter calibration circuit 47 which is connected to the indicator via a multi-conductor path 48. The meter calibration circuit 47 senses the ambient temperature of the battery 41 by means of the temperature probe 49 which is connected to the meter calibration circuit 47 through path 50.

In operation, the apparatus of FIG. 5 is used to establish the performance of a selected battery at a predetermined low temperature, though the battery is actually at ambient temperature, by the steps out lined below.

First, the rating of the battery 41 is determined by examination of the battery or by the requirements of the automotive vehicle in which the battery is to be used. Normally, a rating system is used in which the rating of the battery is equal to the cubic inch displacement of the engine of the automotive vehicle in which the battery is used. Compensation on this CID rating is made for special load conditions, such as air conditioning equipment.

Second, the load 42 to be applied to the battery in accordance with the CID rating is accomplished by setting the load selector switches of the load control circuits 39. The load circuit 42 can comprise simple fixed resistors, variable manually controlled rheostats such as carbon-pile resistors, or more complex solid state devices. The load control circuits 39 also may employ simple single pole switches or complex switches in solenoid arrangements to select the proper load in terms of CID current rating or, alternately, it cam comprise automatic devices for selecting the proper load in accordance with the preprogrammed values of current, voltage, or some other parameter.

Third, the load and voltage indicating equipment are connected to the battery 41 by means of simple battery clips or by means of high power clamps including those more elaborate clamping devices which include a temperature probe.

Fourth, the voltage indicating device, which may consist of a standard DC meter or more elaborate digital measuring equipment, is set in accordance with the requirements of the battery as to number of cells.

Fifth, the voltage indicator 45 is calibrated to the temperature curve of FIG. 3, or its equivalent mathematical function, by means of the meter calibration circuit 47. The meter calibration circuit can comprise any non-linear element which will respond to the temperature of the battery as measured by the temperature probe 49 and and may shunt the meter to form the correct curve in accordance with the requirements of the temperature curve or, alternatively, it can comprise series circuits for calibrating the voltage indicator. In either the series or shunt configuration, the active non-linear element can be a simple thermister or more complicated servo-driven bridges or simple analog or digital computers which will provide the functions required by the mathematical expression extablished by the requirements of the curves of FIGS. 3 and 3A.

SPECIFIC APPARATUS EMBODIMENTS

Figure 6:
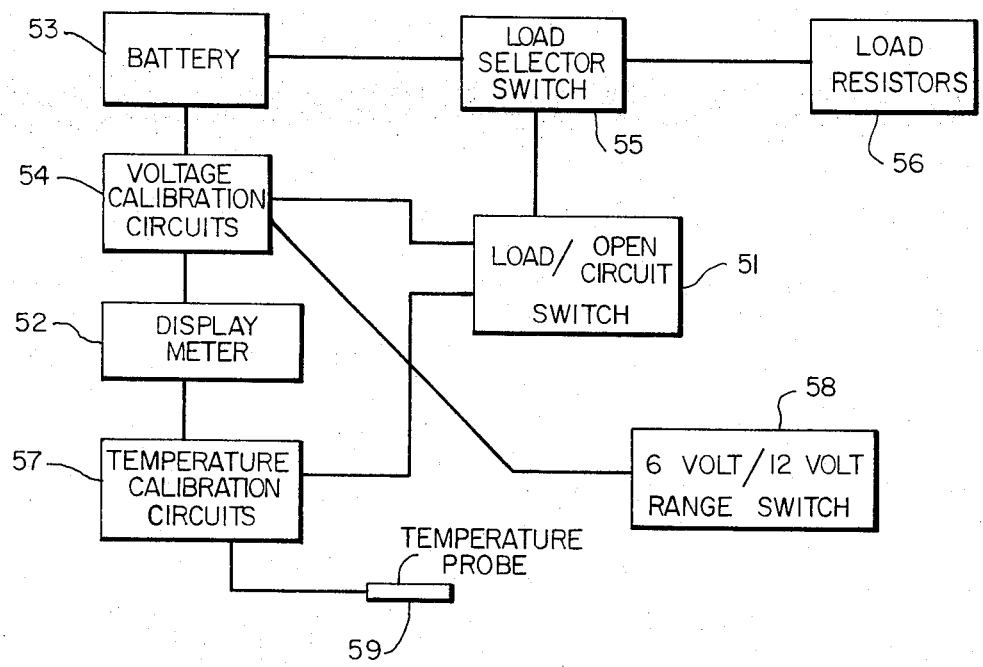
FIG. 6 is a block diagram of one particular embodiment of a battery testing apparatus according to the invention.

The basic components of one embodiment of the apparatus, and their interrelation, are illustrated in FIG. 6. The apparatus can be operated in either the load or open circuit mode as determined by the manual setting of a selector switch 51. In the open circuit mode, a meter 52, which is connected to battery 53 through a voltage calibration circuit 54, displays the terminal voltage of the unloaded battery. Switch 51 functions to disconnect the load selecter switch 55, associated load resistors 56 and the temperature calibration circuits 57 from the battery in the open circuit mode. Switch 51 also function to change the calibration circuits, i.e., in the load mode one set of calibration circuits is used and in the open circuit mode a second set of calibration circuits is employed.

A range switch 58 is provided to adapt the apparatus to either 6- or 12-volt batteries. In the 12-volt position of switch 58, series resistors are inserted to reduce the sensitivity of the meter 52. In addition, the range switch is used to insert a duplicate set of calibration circuits in the 12-volt position so that the display meter 2 can be calibrated in either the 6- or 12-volt range. Thus, four calibration circuits are required for the display meter; two in the 6-volt range for the load and open circuit modes, and two in the 12-volt range for the load and open circuit modes.

The display meter 52 is automatically calibrated for variations in the temperature of the battery 53 by means of the temperature calibration circuits 57, which respond to the temperature of the battery by means of the temperature probe 59. The temperature calibration circuits automatically permit the display meter to extrapolate the condition of the battery to 0° F regardless of the actual temperature of the battery during the test, in accordance with the method previously discussed.

Figure 7:
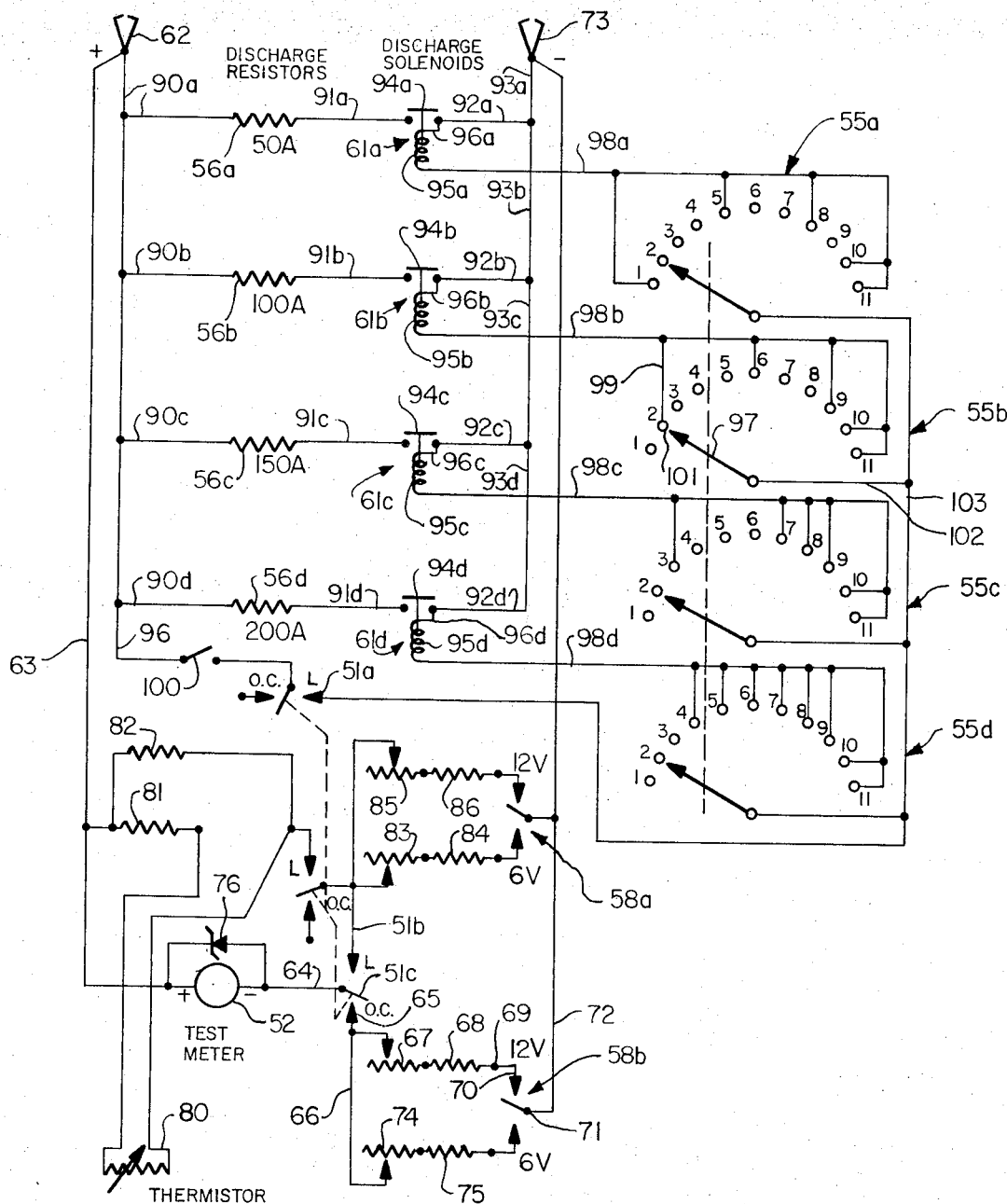
FIG. 7 is a schematic diagram of the apparatus of FIG. 6.

FIG. 7 is a detailed schematic diagram of one apparatus embodiment and, where possible, employs the same reference numbers used in the description of the block diagram of FIG. 6. The mode selector switch comprises a three section switch 51a–51c with each section having a movable contact which can be engaged selectively with either an "open circuit" fixed contact or a "load" fixed contact, the three movable contacts being ganged for simultaneous operation. FIG. 7 shows the mode selector switch in open circuit position, with meter 52 in this embodiment a suppressed zero voltmeter, connected to measure the open circuit voltage at the battery terminals, the load circuitry including load resistors 56a–56d, load selector switches 55a–55d and solenoids 61a–61d being disconnected.

The positive terminal of meter 52 is connected to the positive terminal of the battery (not shown) by battery connector clamp 62 through lead 63. The negative terminal of meter 52 is connected to the movable contact of the mode selector switch 51c via conductor 64. In the open circuit mode position of switch 51c, the fixed contact 65 is connected via conductor 66 to the calibration resistors. The calibration resistors include two fixed resistors and two variable potentiometers. In the 12-volt position of the range switch 58b, the variable resistor 67 and the fixed resisters 68 are connected in series between the meter and the battery through conductor 69, fixed contact 70, movable contact 71 of switch 58b, and lead 72 to battery connector clamp 73 and the negative terminal of the battery (not shown). With switch 58b in the 6-volt range position, the variable resistor 74 and the fixed resistor 75 are connected in series between the meter and the negative terminal of the battery. A Zener diode 76 is connected across the terminals of the meter 52 at all times to protect the meter from over voltage conditions.

When mode selector switch 51 is actuated from the open circuit position to the load position, three basic changes in the circuitry are made. First, through section 51a of the mode selector switch, the load circuitry becomes energized, permitting the application of the load resistors 56a–56d to the terminals of the battery. Secondly, with sections 51b and 51c of the mode selector switch in the load position, the automatic calibration circuit composed of the thermistor 80 and the associated fixed resistors 81 and 82 become active in the metering circuit. With the calibration circuits composed of the three components 80, 81 and 82 shunting the meter 52, the sensitivity of the metering circuit will be changed and, therefore, through the function of the third section of the mode selector switch 51c, new voltage calibration resistors are required to permit calibration adjustments of the meter. These calibration resistors include a variable resistor 83 and a fixed resistor 84 in the 6-volt range position of switch 58a, and variable resistor 85 and fixed resistor 86 in the 12-volt position of the range switch 58a.

The load circuits of the apparatus function as follows:

Clamps 62 and 73 are connected to the positive and nagative terminals respectively of the battery to be tested. One terminal of each of resistors 56a–56d, which are identified by their current rating, are connected through conductors 90a–90d to clamp 62. The other terminal of each load resistor 56a–56d is connected to the negative terminal of the battery via clamp 73, conductors 91a–91d, 92a–92d, 93a–93d and solenoid contacts shown generally at 94a–94d.

The contacts 94a–94d are closed by the application of current through the respective coils 95a–95d of the solenoids. One terminal of each of the solenoid coils is connected to the negative battery terminal through paths 96a–96d. The current path for the coils of the solenoids is completed through the movable contact of the load selector switch 55 and through the switch 51a and finally back to the positive terminal of the battery through path 96 and the battery clamp 62. Note, however, that the solenoid can only be energized when the open circuit/load switch 51a is in the load position.

In operation, the 100-ampere load resistor 56b would be applied to the terminals of the battery by the operator first setting the open circuit/load selector switch to the load position and second, by the operator setting the movable contact arm 97 of the load selector switch 55b, to the movable contact arm 97 through paths 102 and 103 to the fixed and movable contacts of the open circuit/load selector switch 51a, through the contacts of switch 100, and finally through the path 96 to the battery test clip 62 to the positive terminal of the battery. Thus, with current flowing through the coil 95b of the solenoid, the contacts shown generally as 94b will be closed and a 100-ampere load applied to the terminals of the battery. Other loads can be applied to the battery by the selective setting of the load selector switch 55a. The selector switch has been connected so that loads from 50 amperes to 500 amperes can be obtained in steps of 50 amperes.

As previously described, the automatic calibration circuits composed of components 80, 81 and 82, function to permit the apparatus to extrapolate data taken at one temperature to the test conditions which would exist at a second temperature. The equations of FIGS. 3 and 3A indicate that the effective voltage at the terminals of the battery increases with the temperature. In order that the test meter indicate the same performance qualities if the battery were tested at 0° F, it is necessary that the meter be reduced in sensitivity and the characteristics of the thermistor 80 function to reduce the sensitivity of the test meter 52 by shunting a portion of the current. The thermistor is placed in thermal contact with the battery so that its temperature follows the temperature of the battery. The values the fixed resistor 81 which is in series with the thermistor 80 and the fixed resistor 82 which is in parallel with the meter and the combination of fixed resistor 81 and thermistor 80 are chosen so that the requirements of the equation just described are adequately met.

Thus, for example, for an apparatus that would measure the capacity of a battery at 80° F to obtain the starting characteristics of the battery at 0° F, the values of the circuit would be

| | |
|---|---|
| 85 | 50 ohms |
| 83 | 50 ohms |
| 67 | 50 ohms |
| 74 | 50 ohms |
| 81 | 10 ohms |
| 82 | 390 ohms |
| 86 | 39 ohms |
| 84 | 10 ohms |
| 68 | 100 ohms |
| 75 | 39 ohms |
| 76 | 3.6 volts |
| 80 | Thermistor |

Figure 6A:
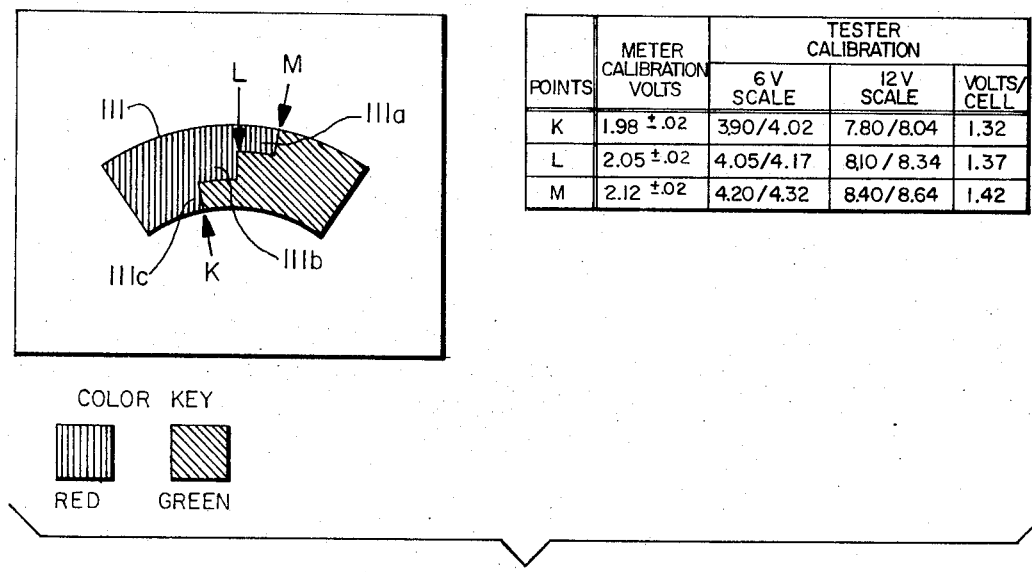
FIG. 6A is an illustration of a meter dial typically calibrated according to the invention, coupled with a matching table of values.

The cold battery test apparatus accurately determines the cranking capacity and the state of charge of a battery over the temperature range from 0° F to 125° F. The test results are provided in terms of the cranking power of the battery measured in amperes, which may be related directly to the engine cubic inch displacement. The indicated performance of the battery can be adjusted for cars with air conditioning or automatic transmissions. The state of charge, which is read from the meter in terms of percent of charge, is determined by measuring the voltage at the terminal of the battery after first removing the surface charge from the battery by a 15-second discharge. The meter scale for the test meter 52, as employed by the apparatus just described with reference to FIG. 7, is shown in FIG. 6a.

The lower scale 111 is used in the cranking capacity test. The scale sector 111a is used for cars equipped with air conditioning and automatic transmission. Sector 111b is used for cars equipped with automatic transmissions only and sector 111c is used for compact cars and those with standard transmissions.

In operation, the apparatus will determine the ability of a battery to provide the required cranking power, for an internal combustion engine of specific cubic inch displacement, when the following simple steps are followed.

1. Insert the temperature probe 80 into one of the cells of the battery.
2. Connect the battery clamps to the terminals of the battery observing the polarity requirements.
3. Set the range selector switch 58 to the 12 or 6-volt position according to the requirements of the battery.
4. Set the load selector switch 55 to the proper load according to the cubic inch displacement of the engine.
5. Depress the load switch 100 for 15 seconds to remove any surface charge from the battery. When the voltage has stablized, read and load scale referring to line K, L or M, depending on the car accessories.

As described previously, the curves of FIGS. 3 and 3A and the equivalent mathematical equations are based on holding the current through the external load resister constant during the test. Referring back to FIG. 2, and the equivalent circuit, FIG. 1 the battery can be discharged at rated cranking amperes by a resistor of exactly the right value. In the equipment of FIG. 7 there are only ten resistors available so the exact discharge current cannot be chosen. The calibration circuit then will not exactly follow the curve 22 of FIG. 3. The equipment will, however, provide a very good approximation.

SECOND APPARATUS EMBODIMENT

Figures 8, 8A, 8B:
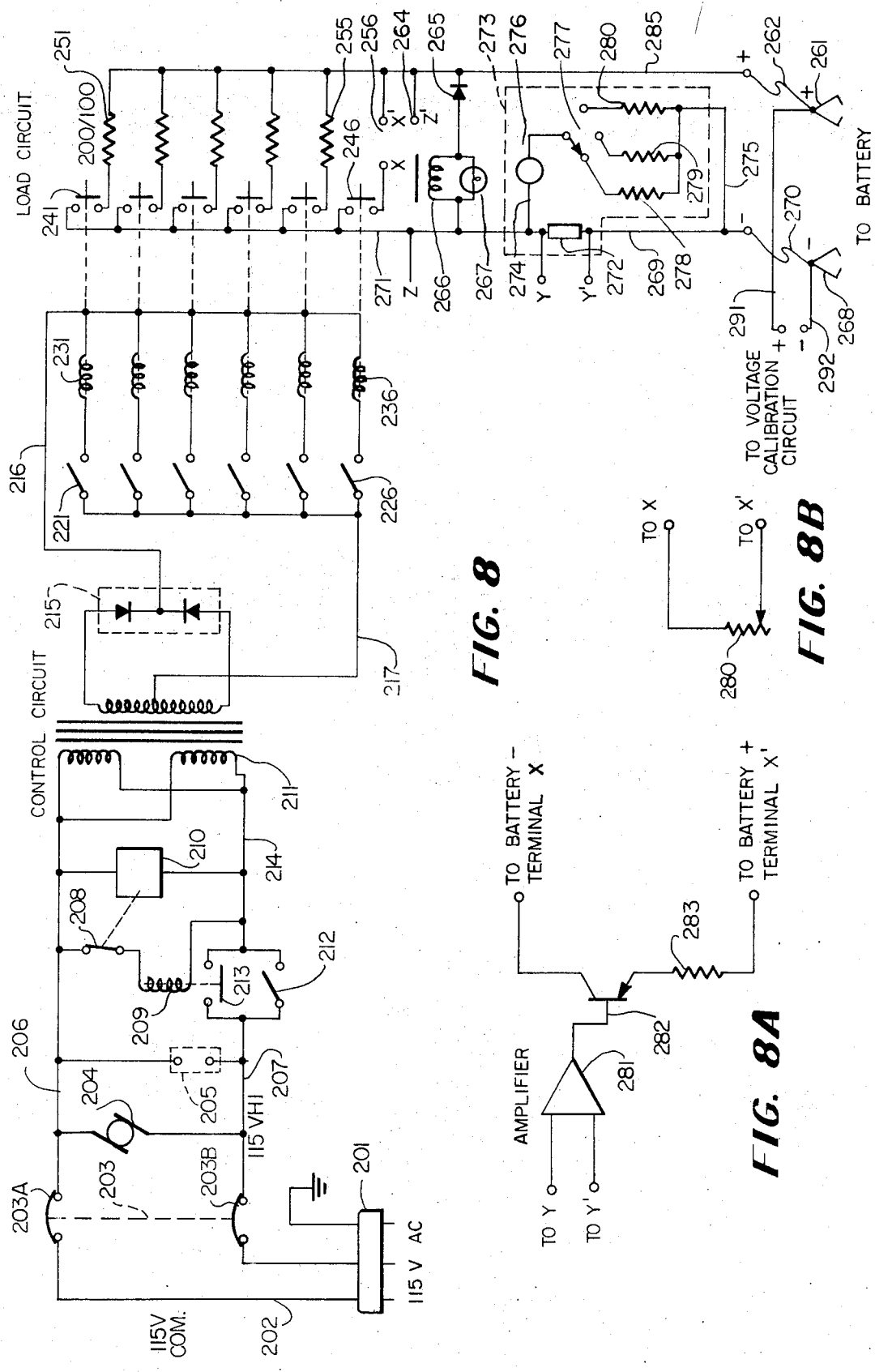
FIGS. 8 and 8a–8b are a schematic diagram of a battery testing apparatus according to another embodiment.
Figure 9:
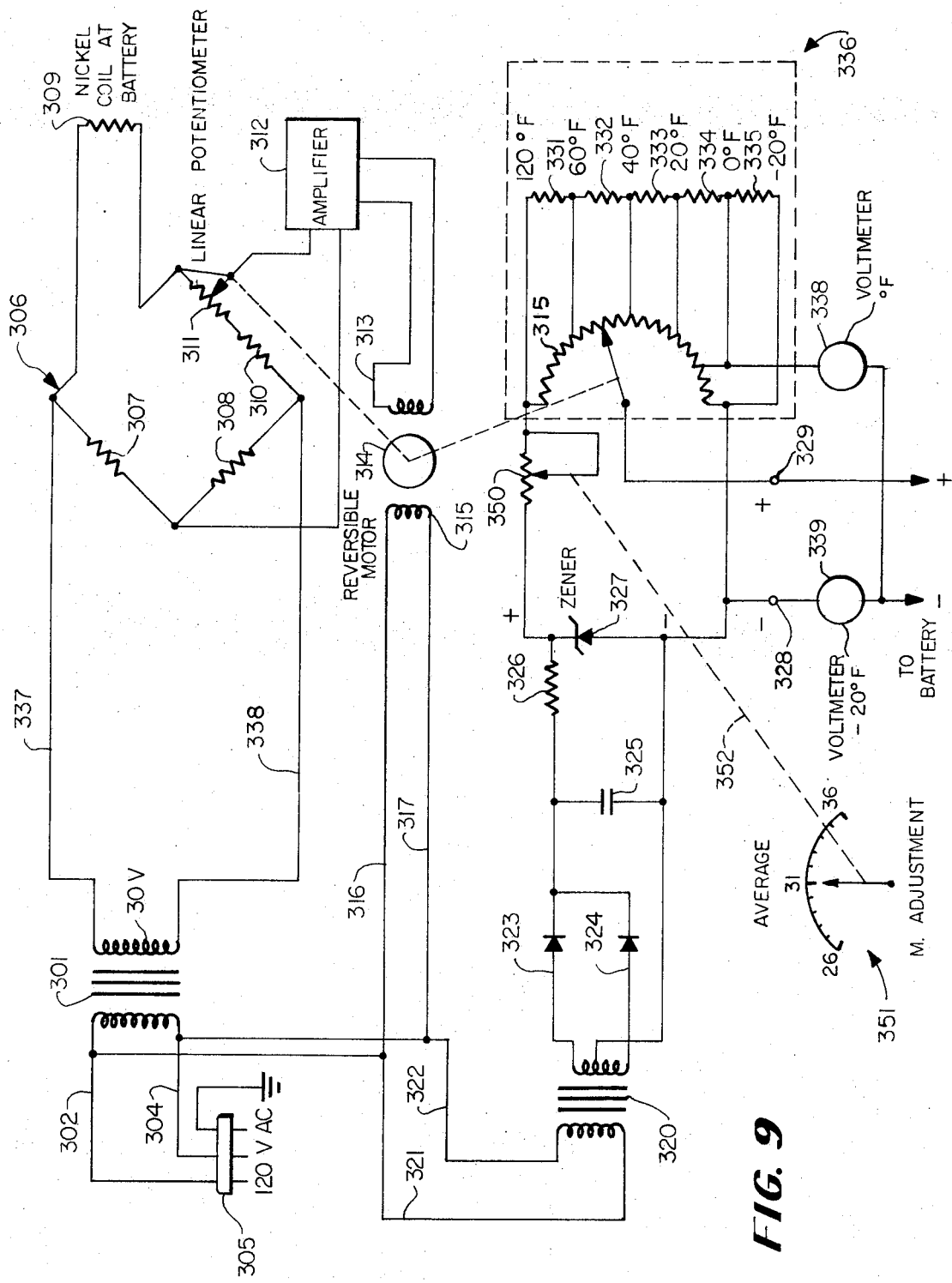
FIG. 9 is a schematic diagram of a voltage calibration circuit useful in accordance with the invention.

While the apparatus of FIG. 7 is particularly useful to service station purposes, FIG. 8 illustrates a more elaborate, more accurate, laboratory-type of cold test apparatus. This embodiment comprises a control circuit and load circuit as shown in FIG. 8 and a voltage measuring and voltage calibration circuit as shown in FIG. 9.

The power supply portion of the control circuit is connected to a source of power, e.g., 115 volts AC, through a connector 201. One side of the 115 volt AC line is connected via path 202 to the normally closed contacts 203a of circuit breaker 203, and thence to the blower 204 and the neon indicator 205 through path 206. The return path for the 115 volts is through path 207 and the normally closed circuit breaker contacts 203b to connector 201. Thus, when connector 201 is first connected to the source of power, the blower 204 and indicator 205 are immediately energized.

One side of the 115 volt power is also connected through circuit breaker contacts 203a and path 206 to the normally closed contacts 208 of solenoid 209 and also to timer 210 and to step-down transformer 211. The return path for transformer 211, timer 210 and solenoid 209 is via conductor 214 and the foot switch 212 to the power source at contacts 203b of the circuit breaker. Self-holding contacts 213 of solenoid 209 are connected in parallel with the contacts of foot switch 212, the solenoid 209 will be energized, closing and holding the contacts 213 until such time as the contacts 208 of timer 210 are opened by the operation of the timer, thus deenergizing soleniod 209, opening the contacts 213 and restoring the circuit to its original de-energized position. The low voltage output of transformer 211 is connected to the dual rectifiers 215 which supply unregulated and unfiltered power through paths 216 and 217 to the series connection of switches 221-226 with solenoid coils 231-236 respectively. The energization of solenoids 231-236 close contacts 241-246 respectively, thus placing resistor loads 251-255 across the terminals of the battery (not shown) under test. Note that the contacts 246 of solenoid 236 are used to select an auxiliary power load which may be connected to the battery through terminals 256 marked X and X'. The load resistors 251-255 are selected to draw either 100 or 200 amperes each from the battery when the solenoid terminals 241-145 respectively are closed. The current drawn by the load resistors 251/255 of either 100 or 200 amperes is determined by the voltage of the battery, i.e., the battery of 6-volts will pull 100 amperes through each resistor while a battery of 12-volts will draw 200 amperes through each load resistor.

The positive terminal of the battery is connected by means of clamp 261, and paths 262 and 285 to the common side of the load resistors 251-255, respectively, and also to the terminal 256 designated X' for connecting to an auxiliary load. The positive voltage from the battery is also connected through path 258 to diode 265 and to terminal 264 designated Z' for connection to the voltage measuring equipment to be described hereinafter.

The reverse polarity warning indication system comprising indicator lamp 267, buzzer 266, and diode 265 is activated in the event that the battery clamps 261 and 268 are connected in a reverse manner to the terminals of the battery. That is, if the battery clamp 261 is connected to the negative terminal of the battery and the battery clamp 268 is connected to the positive terminal of the battery, current will flow through diode 265 energizing the buzzer 266 and the indicator lamp 267.

The return path for all of the battery loads to the negative terminal of the battery is through paths 271, 269, 270 and clamp 268. The current through battery loads 251-255 and the auxiliary loads 256 is all drawn through the meter shunt 272. The passage of a current through the meter shunt 273 develops a voltage proportional to the current which appears at the shunt terminals indicated as Y, Y'. The voltage is also presented by paths 274 and 275 to the meter shown generally at 273. Meter 273 can comprise a voltmeter 276 and the shunt 272, with the meter indicating current in amperes. Switch 277 and resistors 278, 279 and 280 are provided to vary the range of the meter 276.

In operation, the circuits of FIG. 8 perform as follows: The desired load on the storage battery under test is determined by closing one or more of the load selector switches 221-226. The circuit is activated by at least a momentary closure of the foot switch 212 which applies 115 volts to the entire unit. Solenoid 209 is thus energized and self-holding contacts 213 are closed so that power remains applied to transformer 211 even though switch 212 is open. The voltage applied to the primary of transformer 211 is stepped down and rectified by the diodes 215. The raw DC voltage is applied to the combination of switches 221-226 and solenoid 231-236. The battery loads which have been preselected by the closure of switches 221-226 are applied to the battery under test through a solenoid contact 241-246, respectively. Upon application of the load to the battery, a current is drawn through the ammeter shunt 272, thus causing a proportional display on the meter 276.

The currents drawn from the battery through the load resistors 251-255 are in discreet current steps of 100 or 200 amperes each. Additional load current can be drawn from the battery by connecting the variable resistor 280, FIG. 8b, to the terminals 256 designated X and X' in FIG. 8. Variable resistor 280 is generally a carbon pile rheostat which can be manually adjusted to any value of load current from a few to 200 amperes. Thus, by means of a proper combination of load resistors 251-255 and 280, any value of current can be selected from a few amperes to 600 amperes in the 6-volt range and 1,200 amperes in the 12-volt range.

As just described the load current drawn from the battery can be determined by the selection of the load selector switches 221-226 and manual adjustment of the variable resistor 280 shown in FIG. 8b. The automatic load control circuit of FIG. 8a can be used in place of the variable resistor to load current drawn from the battery. A DC amplifier is connected to the meter shunt 272, FIG. 8, through terminals Y and Y'. The output of amplifier 281 is applied to the base of the PNP transistor 282. The collector of transistor 282 is connected to the negative terminal of the battery and the emitter is connected through resistor 283 to the positive terminal of the battery via connections labeled X and X'. Amplifier 281 includes a DC level control for initially establishing the current level which the automatic amplifier circuit must track.

In operation, the automatic amplifier circuit of FIG. 8a performs as follows. Upon application of power to the circuits of FIG. 8 and 8a, an initial current is established trhough the ammeter shunt resistor 272, FIG. 8. The voltage developed across the ammeter shunt is applied to the terminals Y–Y' of amplifier 81 which amplifies the D.C. signal and produces an output signal related to the current through the ammeter shunt. The output voltage from the amplifier is applied to the base of the emitter follower comprising transistor 82 and resistor 83, thus controlling the current through the collector emitter path of the transistor. The source of the collector current is the battery under test via terminal X and X' thus contributing to the battery load. Any change in current through the battery, and therefore through the meter shunt 272 will produce a proportional change in voltage across the meter shunt which is applied to the amplifier 81. The phasing of the amplifier is such that a decrease in the current drawn through the meter shunt 272, brought about by the discharge of the battery under test, will result in a signal at the base of transistor 282 so as to produce a proportionate increase in the current of the transistor. Thus, once the predetermined initial value of current is determined by presetting the value in the level control of amplifier 281, the circuit functions to maintain this constant current through the load circuits of the battery under test.

A simple voltage indicating system and calibration circuit in accordance with this invention and useful in the circuit of FIG. 8 have been descrived in relation to FIG. 7 and comprise thermistor 80, meter 51 and calibration and protective devices 81, 82 and 76, respectively. In applying this circuit to the embodiment of FIG. 8, the voltage calibration circuits of FIG. 7 are connected to the load and load control circuits as well as the battery through circuit paths 291 and 292.

A second embodiment of the voltage display and calibration circuits is shown in schematic form in FIG. 9. Here, the circuit includes a step-down transformer 301 connected to a source of alternating current power such as 120 volts AC through paths 302, 304 and connector 305. The secondary of the transformer supplies approximately 30 volts AC to a bridge circuit, shown generally at 306, through paths 337 and 338. The bridge circuit includes one divider comprising a nickel coil 309 for sensing the temperature of the battery under test, on the one hand, and, on the other hand, the series combination of a fixed resistor 310 and a linear potentiometer 311. Approximately 30 volts AC obtained from the secondary of the transformer 301 is applied via path 337 at the junction of fixed resistor 307 and the nickel coil 309 on one side and via path 338 from the secondary of the transformer, is applied to the junction of fixed resistors 308 and 310 at the opposite corner of the bridge. The output of the bridge circuit 306 is sensed by the amplifier 312, which is connected between the movable contact of the linear potentiometer 311 and the junction point between fixed resistors 307 and 308. The output of amplifier 312 is connected to a winding 313 of the AC reversible motor 314. A second winding 315 is connected to the source of AC power through paths 316 and 317 and connector 305. The mechanical output of the reversible motor 314 in the form of shaft rotation is coupled to the linear potentiometer 311 and a slide wire potentiometer shown generally as 336, the coupling between the motor 314 and the two potentiometers 311 and 336, which is shown symbolically as a dotted line, can actually consist of a suitable gear box or gear reduction to form a desired ratio of motor shaft rotation to potentiometer shaft rotation. The taps on the slide wire 318 accomplish a series of linear voltage drops with shaft rotation or with temperature to match a series of linear volt-/temperature lines covering the range of −20° to 120° F as shown in FIG. 3A. The primary of a second step-down transformer 320 is connected to a source of AC power through paths 321 and 322 and connector 305. The low voltage secondary output of the transformer 320 is coupled through rectifiers 323 and 324 to filter capacitor 325 to combine to form a simple low voltage direct current voltage supply. The DC voltage from this supply is applied through a current limiting resistor 326 to Zener diode 327 for the purposes of regulating the low voltage DC. The regulated DC voltage is applied to the calibration potentiometer shown generally at 336. Positive voltage from the voltage calibration circuit is obtained from the movable contact of the calibration potentiometer 336 which connects to the positive battery terminal. The negative side of the calibration voltage is available at terminal 328 for voltmeter 339 which reads battery voltage at −20° F. To read battery voltage at 0° F, a voltmeter 338 is connected to a tap on the slide wire 336 at the 0° F point. Both voltmeters also connect to the negative terminal of the battery. On the 0° F voltmeter, a suitable voltage developed by the calibration circuit is subtracted from the terminal voltage of the battery when the battery is above 0° F, and added to it when it is below 0° F. On the −20° F voltmeter, the full calibration voltage is always subtracted from the battery voltage and the battery must be above −20° F.

In operation, the calibration circuit of FIG. 9 operates a follows: Changes in the resistance of the temperature sensing element 308, caused by temperature changes in the battery in which the sensor is installed, result in balancing or unbalancing the bridge circuit shown generally at 306. The balancing or unbalancing of the bridge results in an alternating current output which is supplied to the amplifier 312. This amplifieed signal is used to drive one coil of the reversible motor. Phasing of the various signals of the bridge circuit and the windings on the motor is such that the motor always rotates in a direction to cause an improvement in the balance condition of the bridge circuit, thus reducing the output signal of the amplifier and causing the motor to decrease in speed or finally stop.

The output of the reversible motor 314 is coupled to bot the calibration potentiometer 336 and the linear potentiometer 311. Thus, the potentiometers track each other accurately. A voltage obtained across the regulating Zener diode 327 is applied to the end terminals of the potentiometer 336. Thus, as the temperature sensing coil 309 varies in resistance, thus balancing and unbalancing the bridge, a voltage proportional to the rotation of the linear potentiometer is produced between the negative terminals of the supply voltage and the sliding member of the linear potentiometer shown generally at 336. The potentiometer 336 can be shunted by fixed resistors 331–335, in order to accomplsih a series of linear voltage drops with shaft rotation or with temperature to match a series of linear volt/amp lines shown in FIG. 3A. Thus, the output voltage read at the movable contact of the potentiometer can essentially follow the non-linear function relating cell voltage to temperature.

As has been discussed with reference to FIGS. 3, 3A and 4, the effects of temperature on cell voltage when the battery is being discharged at a stated cranking ampere rate are adequately uniform for most testing purposes, despite the fact that batteries of different construction, for example, may not behave identically. Accordingly, for sevice station battery testing purposes, where the testing apparatus must have an accuracy of only ± 10 percent, the apparatus can be designed and constructed according to FIG. 7, for example, to conform to the actual voltage/temperature relationship with a considerable degree of approximation. When testing is to be done in a laboratory or a battery manufacturing plant, higher accuracies may be required, arrived at, for example, with the more elaborate calibrating circuit of FIG. 9, yielding accuracies within ± 5 percent for most batteries. To achieve higher accuracies, approaching ± 1 percent, the calibrating circuit can be made adjustable to suit the particular battery being tested. Thus, the circuit of FIG. 9 can be provided with a potentiometer 350 connected to adjust the voltage supplied to potentiometer 336. Potentiometer 350 is equipped with manual adjusting means including a pointer and dial 351, the dial being calibrated to indicate the value of M, in the range of 26–36, in conformity with the equation $$E = E_o + T^{.5}/M$$

wherein

E = measured cell voltage $E_o$ = 1.2 volts

T = the actual battery temperature, at the time of testing, in °F, and

M = is a value found to vary from 26 to 36 for batteries of various types.

In the embodiments of the apparatus described, the battery under test has been discharged at a stated ampere rate, such as the cranking amperes, and means has been provided to determine the battery voltage and convert that into the desired test indication. In those cases where the battery is substantially above, or below the stated rate, the test indication obtained will be, correspondingly, substantially above or below that which would correspond to the stated rate, e.g., substantially above or below 1.2 volts per cell. With minor modification of the sensing circuit, the apparatus can thus be used to ascertain the actual cranking ampere rating of the battery, as distinguished from the stated rating. In the apparatus of FIGS. 8, 8B and 9, this is accomplished by adjusting the discharge current to hold the test indication at the target value, e.g., that corresponding to 1.2 volts per cell in the cases where 0° F is the predetermined temperature of the test, and then reading the actual current on the ammeter 276, FIG. 8. The modification required is that the amplifier 281, FIG. 8A, be connected to respond to corrected battery voltage, rather than current.

While particularly advantageous embodiments of the invention have been disclosed for illustrative purposes, it will be clear to those skilled in the art that various changes and modifications can be made therein without departing from the scope of the invention as defined in the appended claims. Thus, instead of employing a conventional moving pointer type of voltmeter as the indicator, any suitable electro-responsive indicator, such as a digital voltmeter or an oscilloscope, capable of being calibrated, can be used. Similarly, though load resistors which simulate actual loads have been disclosed, the battery can be discharged through, e.g., the loaded starting motor of an engine of the rated cubic inch displacement.

What is claimed is:

1. The method for testing a lead-acid storage battery to determine, with accuracies at least adequate for automotive service station battery testing purposes, whether the battery is capable of delivering a stated cranking current at a predetermined temperature when the battery is in fact at a different temperature, comprising discharging the battery substantially at said stated current for a short period of time;

deriving from the battery while it is still being so discharged an electrical quantity representative of the actual terminal voltage of the battery at the end of said period of time;

determining the actual temperature of the battery;

converting said electrical quantity into an observable indication which differs from that which would accurately indicate the actual terminal voltage of the battery by an amount corresponding to the value obtained by determining, from a curve falling within area A, FIG. 3, and representing terminal cell voltage versus battery temperature substantially at rated constant discharge current, the difference between the voltage values of the curve at the predetermined actual temperature of the battery and at said predetermined temperature; and comparing said indication with that which should be exhibited by the battery if capable of supplying said stated current when at said predetermined temperature.

2. The method according to claim 1, wherein the predetermined temperature is 0° F.;

the test is carried out with the battery at a temperature greater than 0° F.; and said electrical quantity is the terminal voltage of the battery in volts per cell; and said step of converting said electrical quantity into an observable indication comprises changing said electrical quantity by an amount $T^p/M$ volts per cell, where T = the actual temperature of the battery, in degrees Fahrenheit, at the time of testing, $p = 0.5$, and M = a value selected from the range 26–36 to provide a desired test accuracy.

3. The method according to claim 1, wherein said curve is one of a family of curves which includes a first curve comprising a series of straight line segments including a first segment commencing at 0.97 volts at −20° F. and extending to 0° F. with a slope of 0.0015 volts per °F., a second segment commencing at 0° F. at the end of said first segment and extending to 20° F. with a slope of 0.007 volts per °F., a third segment commencing at 20° F. at the end of said second segment and extending to 40° F. with a slope of 0.0035 volts per °F., a fourth segment commencing at 40° F. at the end of said third segment and extending to 60° F. with a slope of 0.0025 volts per °F., and a fifth segment commencing at 60° F. at the end of said fourth segment and extending to 120° F. with a slope of 0.0015; and the like curves defined by voltage values within ± 10 percent of the voltage values of said first curve.

4. The method according to claim 1 adapted to be practiced in automotive service station battery testing, wherein said predetermined temperature is 0°F., and
said curve is a straight line with a slope of 0.0026–0.0032 volts per +F.

5. The method according to claim 1 adapted to be practiced in automotive service station battery testing, wherein said predetermined temperature is 0°F., and
said curve is established by the equation
E = A + KT, wherein E is the battery cell voltage, A is a value selected from the range 1.08–1.32 volts, K is a value selected from the range 0.002–0.004 volts per cell per °F.

6. The method for testing lead-acid storage batteries to determine, with accuracies at least adequate for automotive service station battery testing purposes, the cranking amperes which the battery can supply at a predetermined low temperature when the battery is in fact at a different temperature, comprising:

discharging the battery for a short period of time at a rate at least substantially equal to the cranking ampere rating of the battery;
determining the actual temperature of the battery;
deriving from the battery an electrical quantity representative of the actual terminal voltage of the battery at the end of said period of time;
converting said electrical quantity into an observable indication;
modifying the observable indication in accordance with the temperature of the battery so that, regardless of the actual temperature of the battery, the indication is equal within ±10 percent to that indication which would represent the electrical quantity which would have been derived from the same battery at said predetermined low temperature; and
comparing said indication with that which should be exhibited by the same battery, if capable of providing its rated cranking amperes, at said predetermined low temperature.

7. The method according to claim 6, wherein
said predetermined low temperature is 0° F., and
the indication which should be provided by the same battery, if capable of providing its rated cranking amperes at 0° F. corresponds to 1.2 volts per cell.

8. The method for determining whether a lead-acid storage battery, installed in an automotive vehicle powered by an internal combustion engine and having a starting motor driven by the battery, will provide adequate power to start the engine if the battery is at 0° F. when the battery is in fact at a temperature higher than 0° F., comprising:

discharging the battery for a short period of time at a predetermined ampere rate substantially equal to the cranking amperes required to start the engine;
determining the actual temperature of the battery;
measuring the terminal voltage of the battery at the end of said short period of time while the battery is still being discharged at said rate;
converting the measured terminal voltage into an observable indication corresponding to what the terminal voltage would have been were the battery at 0° F. by effectively subtracting therefrom a value substantially equal to TP/M volts per cell, where T is the actual temperature of the battery in °F. $p = 0.5$, and M is a value selected from the range 26–36; and
comparing that indication with one which corresponds to 1.2 volts.

9. In an apparatus for testing a lead-acid storage battery to determine, with accuracies at least adequate for automotive service station battery testing purposes, whether the battery is capable of delivering a stated cranking current at a predetermined temperature when the batter is in fact at a different temperature, the combination of:

discharge circuit means comprising means for discharging the battery for a short period of time at a rate at least substantially equal to the stated cranking current; and
test circuit means connectable to the battery and comprising:
thermally responsive means for sensing the actual temperature of the battery,
means for deriving from the battery an electrical quantity representative of the actual terminal voltage of the battery while still being discharged at said rate at the end of said short period of time,
electro-responsive indicating means connected to respond to said electrical quantity,
calibrating means for modifying the indication displayed on said indicating means in accordance with the characteristics normally expected of the battery being tested; and means including said thermally responsive means for further calibrating said indicating means so that, when the battery is capable of delivering said stated cranking amperes and said indicating means therefore would provide a predetermined indication with the battery at said predetermined temperature, said indicating means provides substantially the same predetermined indication in response to the electrical quantity derived from the battery when the battery is at any other actual temperature in the range of from −20° F. to 120° F.

10. The combination defined in claim 9, wherein said discharge means comprises
at least four load resistors, and
means for connecting said load resistors selectively to the battery to provide any of a plurality of discharge rates each matching a different stated cranking current.

11. The combination defined in claim 9, wherein said thermally responsive means comprises
a thermally responsive impedance, and
means whereby said impedance can be associated with the battery to sense the temperature thereof.

12. The combination defined in claim 11, wherein said indicating means is a voltmeter, and
said calibrating means constitutes means for decreasing the sensitivity of said voltmeter by a value in the range of 0.002–0.004 volts per cell for each °F. by which the actual temperature of the battery exceeds said predetermined temperature.

13. The combination defined in claim 9, wherein said calibrating means constitutes means for providing a calibrating electrical quantity of one polarity when the actual temperature of the battery is above said predetermined temperature and of the opposite polarity when the temperature of the battery is below said predetermined temperature.

14. The combination defined in claim 13, wherein said discharge circuit means comprises a load resistor of continuously adjustable resistance value.

15. The combination defined in claim 9, wherein said predetermined temperature is 0° F.,
said indicating means is a voltmeter,
said electrical quantity corresponds to terminal voltage of the battery, and
said calibrating means constitutes means for providing a change in the indication of said voltmeter amounting to $T^{.5}/M$ volts per cell, where T is the actual temperature in °F., and M is a value selected from the range of 26–36.

16. The combination defined in claim 9, adapted to determine the cranking current capability of the battery at two different temperatures, wherein
said indicating means comprises
a first voltmeter for providing indications corrected to one of said predetermined temperatures, and
a second voltmeter for providing indications corrected to the others of said prdetermined temperatures.

17. The method for testing a lead-acid storage battery to determine, with accuracies at least adequate for automotive service station battery testing purposes, whether the battery is capable of delivering a predetermined current at a predetermined temperature when the battery is in fact at a different temperature, comprising
discharging the battery substantially at the predetermined current for a short period of time;
deriving from the battery while it is still being so discharged an electrical quantity representative of the actual terminal voltage of the battery at the end of said period of time;
sensing the actual temperature of the battery;
determining the relationship between battery temperature and cell voltage for the type of battery under test over a temperature range which includes both the predetermined temperature and the temperature sensed by said sensing step;
converting said electrical quantity into an observable indication which differs from that which would accurately indicate the actual terminal voltage of the battery by an amount corresponding to the value obtained by the difference between the cell voltage obtained by said determining step for the actual temperature sensed by said sensing step and the cell voltage obtained by said determining step for the predetermined temperature; and
comparing said indication with that which should be exhibited by the battery if capable of supplying the predetermined current at the predetermined temperature.

* * * * *

UNITED STATES PATENT OFFICE
CERTIFICATE OF CORRECTION

Patent No. 3,781,658　　　　Dated December 25, 1973

Inventor(s) James B. Godshalk

It is certified that error appears in the above-identified patent and that said Letters Patent are hereby corrected as shown below:

Column 2, line 47, "whould" should read --should--.

Column 5, line 10, "discharged" should read --discharge--.

Column 9, line 25, "cam" should read --may--.

Column 11, last line, --of-- should be inserted after "values".

Column 12, line 58, "and" should read --the--.

Column 16, line 39, "a" should read --as--.

line 45, "amplifieed" should read --amplified--.

line 54, "bot" should read --both--.

Column 18, line 32, "predetermined" should read --determined--.

Column 19, line 8, "+F." should read --°F.--.

Signed and sealed this 9th day of April 1974.

(SEAL)
Attest:

EDWARD M.FLETCHER,JR.
Attesting Officer

C. MARSHALL DANN
Commissioner of Patents